Feb. 10, 1953 — H. SMALLINE — 2,628,111
PIPE UNION
Filed Aug. 30, 1948
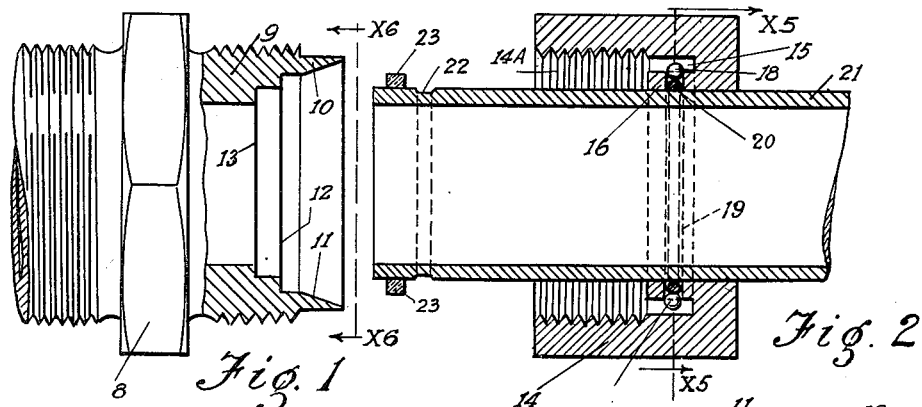
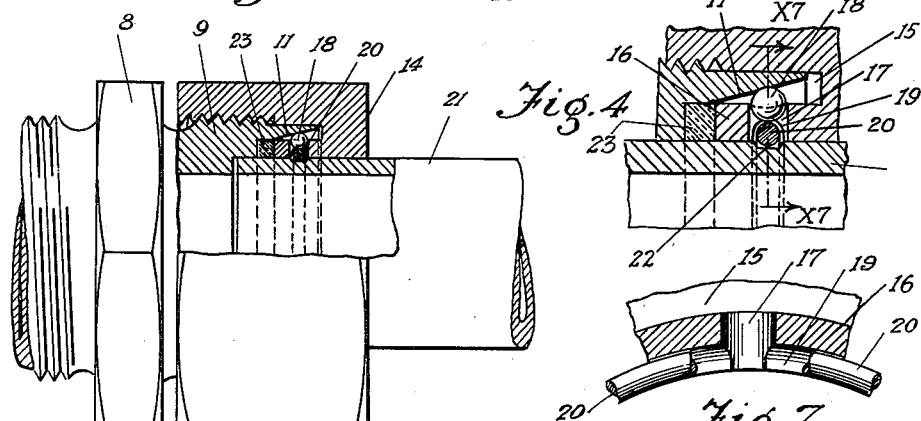
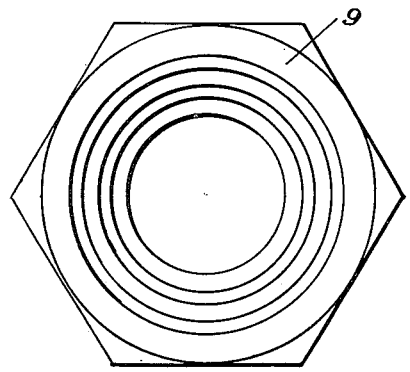
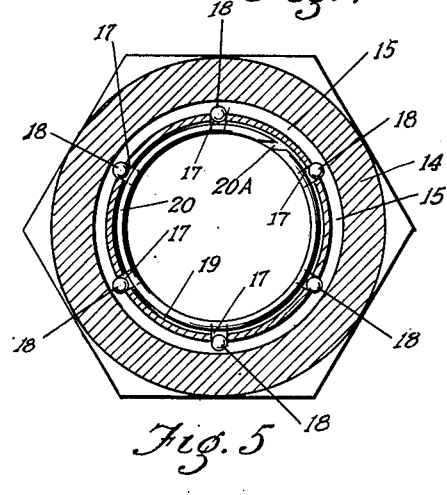
INVENTOR.
Harry Smalline Patented Feb. 10, 1953

2,628,111

UNITED STATES PATENT OFFICE 2,628,111

PIPE UNION

Harry Smalline, North Hollywood, Calif.

Application August 30, 1948, Serial No. 46,751

6 Claims. (Cl. 285—168)

My invention relates to that class of pipe unions required in joining pipes of small diameter, and particularly to tubing employed in the construction of airplanes. Such tubing is an essential element in plane construction and is used to convey fluids, much of it under enormous pressure, to valves and pumps which operate the elevators, flaps, rudders and other moving parts of the ship. Because of its vital function such tubing must possess the greatest possible tensile strength and the unions and joints must be tight and free from the danger of leakage or rupture.

Tempered steel tubing and particularly a dural tubing fill the requirement for tensile strength, but the unions and joints present difficulties. The practice has been to flare the end of the tubing and draw the flared end, by means of a screw nut, against a gasket seat. In order to flare the end of the tubing it is necessary to anneal the metal to render it soft enough to work, and after it has been flared it is necessary to again harden the metal in order to restore its strength and rigidity.

One of the objects of my invention is to provide a pipe union without a flared end of the tubing, thereby obviating the necessity of annealing and retempering the metal with the danger of impairing its strength and rendering it brittle and liable to fracture. The second object of my invention is to provide a pipe union that is tight and free from the danger of leakage or rupture.

I attain these objects by the mechanism described in the following specification and illustrated in the accompanying drawings in which Figs. 1 and 2 show sections of male and female parts of coupling respectively (parts separated). Fig. 3 shows the parts assembled. Fig. 4 shows fragmentary sections enlarged, to more clearly illustrate the locking action. Fig. 5 is a section taken on line $x5$—$x5$ of Fig. 2. Fig. 6 is a section taken on line $x6$—$x6$ of Fig. 1. Fig. 7 is a fragmentary sectional view taken on line $x7$—$x7$ of Fig. 4, showing clearly one of the drilled holes and lock ring groove. Similar numerals refer to similar parts throughout the various views.

The invention consists of the employment of a lock ring 20, adapted to engage an annular groove 22, on one end of the tube 20, to provide a solid shoulder against which the female member of the coupling 14, draws the tubing into the male member 8. An annular gasket 23, encircles the end of the pipe in front of the annular groove and is compressed by the female member against the gasket seat 12 of the male member. The lock ring is split as shown at 20A Fig. 5, to provide for expansion and contraction.

When a pipe union is required the tubing is cut to the required length, the annular groove is milled in the tube at an appropriate distance from the end, the tube is inserted in the female member of the coupling, the lock ring is sprung into the groove, the gasket is placed on the end of the tube and the female member of the coupling is screwed tightly over the male member of the coupling.

In order to press the lock ring into close contact with the metal of the annular groove, the male member of the coupling is provided with a cam projection 10 beveled to form the annular cam face 11. As the coupling is screwed together the cam face overrides the outer circumference of the lock ring and compresses the ring into close contact with the metal of the pipe.

To provide extraordinary closeness of fit and strength of union, when demanded, I have provided a construction in which an annular projection or boss 16 is milled into the female coupling and an inverted annular groove 19 is formed in the boss in which the lock-ring 20 is contained. A plurality of drill holes 17 through the boss in the plane of the annular groove contain balls 18 which project above the outer circumference of the boss.

When the female nut is screwed onto the part 9 the cam projection 10 moves into pocket 15 and cam face 11 engages the balls and depresses them against the lock ring which is compressed with great force into the annular pipe groove. This is a full description of my invention.

I claim:

1. In a coupling, a female coupling member having an outer portion separated from an inner annular portion by an annular channel, said outer portion having a first screw thread, said inner portion having a bore passing therethrough for encircling a cylindrical member and a plurality of transverse openings in said inner portion, an expandible locking ring arranged on the inner side of said inner annular portion for engaging the outer wall of said cylindrical member, a plurality of locking elements arranged on the outer side of said ring and projecting through said openings, the inner ends of said elements engaging said ring and the outer ends lying in said annular channel, and a male coupling member provided with a second screw thread adapted to engage said first screw thread, and provided with an annular outwardly flaring cam member projecting therefrom for insertion into said annular channel for engaging the outer sides of said locking elements whereby said locking elements are urged inwardly by said cam member to press said ring into locking engagement with such cylindrical member, when said male member threadably engages said female member.

2. In a coupling, a female coupling member having an outer portion separated from an inner annular portion by an annular channel, said outer portion having a first screw thread, said inner portion having a longitudinal bore passing therethrough, a cylindrical member passing through said bore and having a circular groove in the outer surface thereof, said inner portion of said female coupling member having a plurality of transverse bores establishing communication between said annular channel and said longitudinal bore, an expandible locking ring arranged on the inner side of said inner annular portion and arranged to register with said circular groove, a plurality of locking elements arranged on the outer side of said ring and projecting through said openings, the inner ends of said elements engaging said ring and the outer ends lying in said annular channel, and a male coupling member provided with a second screw thread adapted to engage said first screw thread, and provided with an annular outwardly flaring cam member projecting therefrom for insertion into said annular channel for engaging the outer sides of said locking elements whereby said locking elements are urged inwardly by said cam member to force said locking ring into said circular groove when said male member threadably engages said female member.

3. In a coupling, a female coupling member having an outer portion separated from an inner annular portion by an annular channel, said outer portion having a first screw thread, said inner portion having a bore passing therethrough for encircling a cylindrical member and a plurality of transverse bores therein, an expandible locking ring arranged on the inner side of said inner annular portion for engaging the outer wall of said cylindrical member, a plurality of balls arranged in said transverse bores on the outer side of said ring, the inner ends of said balls engaging said ring and the outer ends lying in said annular channel, and a male coupling member provided with a second screw thread adapted to engage said first screw thread and provided with an annular outwardly flaring cam member projecting therefrom for insertion into said annular channel for engaging the outer sides of said locking elements whereby said balls are urged inwardly by said cam member to force said locking ring into locking engagement with such cylindrical member, when said male member threadably engages said female member.

4. In a coupling, a female coupling member having an outer portion separated from an inner annular portion by an annular channel, said outer portion having a first screw thread, said inner portion having a bore passing therethrough for encircling a cylindrical member and a plurality of transverse bores therein, and a groove on the inner side of said inner portion that intercepts said transverse bores, an expandible locking ring located within said groove for engaging the outer wall of such cylindrical member, a plurality of balls arranged within said transverse bores, the inner ends of said balls engaging said ring and the outer ends lying in said annular channel, and a male coupling member provided with a second screw thread adapted to engage said internal thread and provided with an annular outwardly flaring cam member projecting therefrom for insertion into said annular channel whereby said balls are urged inwardly by said cam member to force said locking ring into locking engagement with such cylindrical member when said male member threadably engages said female member.

5. A coupling device for pipe unions comprising a female coupling member having an outer portion that is internally threaded at one end thereof, an annular boss secured thereto at a point remote from said threaded end, said boss projecting toward said threaded end so as to form an annular channel between said portions, said boss having a longitudinal bore passing therethrough and being provided with transverse bores providing communication between said annular channel and said longitudinal bore, the inner wall of said boss being provided with a groove that intercepts said transverse bores at the inner ends thereof, balls arranged in said bores, and means including an expansion ring mounted within said groove for preventing said balls from falling out of said bores.

6. A coupling device for pipe unions comprising a female coupling member having an outer portion that is internally threaded at one end thereof an annular boss secured thereto at a point remote from said threaded end, said boss projecting toward said threaded end so as to form an annular channel between said portions, said boss having a longitudinal bore passing therethrough and being provided with a plurality of radially-extending transverse bores providing communication between said annular channel and said longitudinal bore, said bores being arranged in a circular array, the inner wall of said boss being provided with a circular groove that intercepts said transverse bores at the inner ends thereof, balls arranged in said bores, said balls having a diameter greater than the radial thickness of said annular channel, and an expansion ring mounted within such groove for preventing said balls from passing inwardly through said bores.

HARRY SMALLINE.

REFERENCES CITED

The following references are of record in the file of this patent:

UNITED STATES PATENTS

| Number | Name | Date |
| --- | --- | --- |
| 939,908 | Greenlaw | Nov. 9, 1907 |
| 1,056,076 | Wiard | Mar. 18, 1913 |
| 1,128,905 | Roylance | Feb. 16, 1915 |
| 1,130,965 | Doran | Mar. 9, 1915 |
| 1,151,334 | Bell | Aug. 24, 1915 |
| 2,021,241 | Mall | Nov. 19, 1935 |
| 2,069,377 | Matthiessen | Feb. 2, 1937 |
| 2,159,242 | Yanagi | May 23, 1939 |
| 2,182,797 | Dillon | Dec. 12, 1939 |
| 2,394,236 | Eastman | Feb. 5, 1946 |
| 2,394,351 | Wurzburger | Feb. 5, 1946 |
| 2,443,993 | Schenkelberger | June 22, 1948 |
| 2,452,278 | Woodling | Oct. 26, 1948 |
| 2,517,689 | Lement | Aug. 8, 1950 |
| 2,529,534 | Beerli | Nov. 14, 1950 |

FOREIGN PATENTS

| Number | Country | Date |
| --- | --- | --- |
| 366,803 | Germany | Jan. 11, 1923 |